United States Patent Office 3,483,192
Patented Dec. 9, 1969

3,483,192
3 - (17β - HYDROXY - 3 - METHOXYESTRA-1,3,5(10)-
TRIEN - 17α - YL) - 2 - METHYLENEPROPIONIC
ACID γ-LACTONE AND INTERMEDIATES
Edward A. Brown, Wilmette, Ill., assignor to G. D. Searle
& Co., Chicago, Ill., a corporation of Delaware
No Drawing. Filed July 19, 1968, Ser. No. 745,975
Int. Cl. C07c *173/00, 167/34;* A61k *27/00*
U.S. Cl. 260—239.57          8 Claims

ABSTRACT OF THE DISCLOSURE

Preparation of certain 2-substituted 3-[17β-hydroxy-3-(lower alkoxy)estra - 1,3,5(10) - trien-17α-yl]-propionic acid γ-lactones and their anti-ulcerogenic, estrogenic, and antibiotic properties are disclosed.

---

This invention relates to 3-[17β-hydroxy-3-(lower-alkoxy)estra-1,3,5(10) - trien - 17α - yl]-2-methylene-propionic acid γ-lactones, intermediates thereto, and processes for the preparation thereof. More particularly, this invention provides new, useful and unobvious chemical compounds of the formula

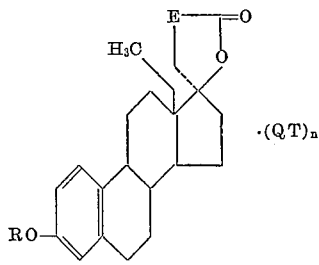

wherein E represents vinylidene or substituted methylene, the substituent being alkoxycarbonyl, carboxyl, or dialkylaminomethyl; R represents lower alkyl; n represents 0 except when E comprehends nitrogen, whereupon n represents 0 or the positive integer 1; Q represents lower alkyl, hydroxy(lower alkyl), lower alkenyl, or aralkyl; and T represents 1 equivalent of an anion. It follows that methylene, carboxyl, an alkanoic acid ester of the latter grouping, or dialkylaminomethyl is unexceptionably attached to carbon atom 2 in the propionic component of the enformulated compounds; and that when n represents 1, the compounds are quaternary salts of 2-dialkyl-aminomethyl - 3 - [17β-hydroxy - 3 - (lower alkoxy)estra-1,3,5(10)-trien-17α-yl]propionic acid γ-lactones, otherwise the moiety represented by QT is not present.

Among the alkoxycarbonyl and dialkylaminomethyl substituents contemplated by E, those of lower order are preferred, i.e., those having the formulas lower alkyl—O—CO— and (lower alkyl)$_2$NCH$_2$— respectively. Illustrative of lower alkyls are methyl, ethyl, propyl, isopropyl, butyl, isobutyl, sec.-butyl, tert.-butyl, pentyl, neopentyl, hexyl, isohexyl, heptyl, and like saturated, monovalent, acyclic, straight- or branched-chain hydrocarbon radicals of empirical formula —C$_a$H$_{2a+1}$ wherein a represents a positive integer less than 8.

Among the lower alkenyls represented by Q, vinyl, allyl, 2-butenyl, 2-methylallyl, and like groupings which can be thought of as derived from a polycarbon lower alkyl by elimination of 2 hydrogens to give rise to a double bond are preferred, whereas benzyl, phenylethyl and naphthylmethyl are preferred aralkyl embodiments of Q.

The anions contemplated by T are preferably chloride, bromide, iodide, nitrate, phosphate, sulfate, sulfamate, methylsulfate, ethylsulfate, benzenesulfonate, toluenesulfonate, acetate, lactate, succinate, malate, maleate, tartrate, citrate, gluconate, ascorbate, benzoate, cinnamate, or the like which, in combination with the cationic portions of the instant quaternary salts, are both chemically and biologically advantageous as set forth below. Equivalent to the quaternary salts and corresponding tertiary bases for the biological purposes (only) of this invention, are the acid addition salts defined by the introductory formula when n therein represents 1 and Q is replaced by hydrogen.

The compounds to which this invention relates are useful by reason of their valuable biological properties. Thus, for example, they are anti-ulcerogenic, estrogenic, and antibiotic. Among the antibiotic effects of the instant compounds are anti-bacterial, anti-algal, anti-protozoal, anthelmintic, anti-fungal, and anti-germinant activities.

The anti-ulcerogenic utility of the instant compounds is evident from the results of a standardized test for their capacity to inhibit the ulceration reported by Shay et al., Gasteroenterology, 5, 43 (1945), to occur in rats subjected to fasting and pyloric ligation. In this test, male Charles River rats weighing 200–500 gm. and fasted 72 hr. prior to ligation are used. Immediately following ligation, the prescribed dose of compound, dissolved or suspended in 1.0 ml. of pH 2.0 hydrochloric acid, is intragastrically administered to each of a group of 6 animals. A like group of animals to which is identically and concurrently administered the acid alone serves as controls. Precisely 19 hr. later, the stomachs of surviving animals are excised and examined under 5× magnification. The number of ulcers occurring in the non-secretory portion of each stomach is counted in 4 groups according to size (<2 mm., 2–4 mm., 4–8 mm., and >8 mm.); and each rat receives a score, z, which is a weighted average of the logarithms of the ulcer counts in the several size groups determined by a formula found approximately optimal by discriminant function analysis to be $z = 20.00 \log (N_1+1) + 0.22 \log (N_2+1)$
$\qquad + 46.76 \log (N_3+1) + 6.11 \log (N_4+1)$ where $N_1 \ldots N_4$ are the observed ulcer counts of the increasing size groups. Since long-term studies in approximately 400 animals show that the average z value for controls is 96.2, with a standard error per group of 6 equal to 18.97, a decrease in the average z score for a given test group, relative to concurrent controls, amounting to 37.5 or more is significant ($P \leq 0.05$) and a compound producing such a decrease is considered anti-ulcerogenic.

The estrogenic utility of the instant compounds is evident from the results of a standardized test for their their capacity to increase uterine weight in immature mice. Procedure is substantially the same as that described by Edgren, Proc. Soc. Exper. Biol. Med., 92, 569 (1956). White, female, 21-day old mice maintained on a synthetic, estrogen-free diet are used as test animals. To each of a group of 6–10 such animals, test compound, dissolved or suspended in corn oil, is administered subcutaneously or buccally on each of 3 successive days. Commonly, the initial total dose is 1 mg. of compound in 0.1 ml. of corn oil administered subcutaneously in 3 equal portions. A second group of 6–10 animals likewise and concurrently administered corn oil alone serves as controls. The day after treatment is concluded, the animals are sacrificed; and the uteri are excised, dissected free of extraneous tissue, blotted to express contained fluid, and individually weighed. A compound is considered active if the mean uterine weight of the animals treated therewith significantly ($P \leq 0.01$) exceeds the mean uterine weight of the controls. Potency of an active compound, relative to estrone, is determined by repeating the test at progressively diminishing doses sufficient to fit a log dose response curve by the method of least squares to a corresponding curve for etrone developed by substituting 0.1 and 0.3 mcgm. of estrone, administered subcutaneously, for test compound in the foregoing procedure. From these curves, a dose of compound and a dose of estrone which produce an identical increase in mean uterine weight are selected, the second value is divided by the first, and the quotient is multiplied by 100 to give the percent potency.

The anti-bacterial and anti-algal utility of the instant compounds is evident from the results of standardized tests whereby sterile blood and Bristol agar plates are inoculated with *Diplococcus pneumoniae* and *Chlorella vulgaris*, respectively; approximately 5 mg. of compound is placed on the surface of each plate so as to cover a circle approximately 4 mm. in diameter; and the plates are thereupon incubated in accordance with the schedule in Table I.

TABLE I

| Organism | Time | Temp., degrees | Artificial Light |
|---|---|---|---|
| D. pneumoniae | 24 hours | 36 | No. |
| C. vulgaris | 5–7 days | 25 | Yes. |

Copper sulfate serves as reference standard in the latter test. Clear zones of inhibition signify the utility in question.

The anti-protozoal utility of the instant compounds is evident from the results of a standardized test for their capacity to inhibit the growth of *Tetrahymena gelleii*. In this test, a nutrient broth consisting of 12 gm. of proteose, petone, 8 gm. of sucrose, and 1000 ml. of water is sterilized, inoculated with an axenic culture of the test organisms, and incubated at approximately 25° for 24 hr., whereupon 0.5 ml. quantities are aseptically transferred to each of two test tubes, one of which contains approximately 5 mg. of compound. After a second 24-hr. incubation at approximately 25°, growths of the organism are compared by microscopic examination.

Further evidence of the anti-protozoal utility of the instant compounds is provided by standardized tests for their capacity to inhibit the growth of *Tritrichomonas foetus* and *Trichomonas vaginalis*, conducted as follows: To 80 volumes of a modified Diamond medium prepared by mixing 12000 parts of trypticase (Balimore Biological Laboratories), 600 parts of yeast extract (Difco), 300 parts of maltose, 60 parts of L-cysteine hydrochloride, 12 parts of L-ascorbic acid, 48 parts of dibasic potassium phosphate, 48 parts of monobasic potassium phosphate, and 54,000 parts of distilled water; adjusting the pH to 6.8 with 4% sodium hydroxide; incorporating 30 parts of agar (Baltimore Biological Laboratories); boiling for 1 minute to dissolve the agar; and sterilizing in an autoclave, is aseptically added 20 volumes of sterile Dubos medium serum. The resultant medium is inoculated with 1% (by volume) of either a 48-hr. or a 72-hr. culture of *T. foetus* or *T. vaginalis*, whereupon one ml. of the inoculated medium is mixed with 10 mg. of test compound. The mixture is incubated anaerobically at 37° for 48 hr. and then examined microscopically for the presence of motile trichomonads. If any are observed, the compound is considered inactive. If no motile trichomonads are observed, 0.1 ml. of the incubated mixture is serially diluted and mixed with additional quantities of the inoculated medium sufficient to produce concentrations of 1000, 100, 10 and 1 mcgm. of test compound per ml., and the resultant mixtures are inoculated anaerobically as before at 37° for 48 hr. and then examined microscopically for the presence of motile trichomonads. Controls are provided by concurrent incubations identical with the foregoing except for the absence of test compound.

The anthelmintic utility of the instant compounds is evident from the results of a standardized test for their capacity to immobilize *Turbatrix aceti*, a representative nematode. In this test, a washed suspension of *Turbatrix aceti* containing approximately 2000 nematodes per ml. is prepared in distilled water, whereupon 1 ml. of the suspension is mixed with 10 mg. of test compound. The mixture is incubated at room temperatures for 48 hr. and then examined grossly for the presence of motile worms. If any are observed, the compound is considered inactive. If no motile worms are observed, 0.1 ml. of the incubated mixture is serially diluted and mixed with a freshly-prepared suspension of the nematode to produce concentrations of 1000, 100, 10 and 1 mcgm. of test compound per ml.; and the resultant mixtures are incubated as before at room temperatures for 48 hr. and then examined grossly for the presence of motile worms. Controls are provided by concurrent incubations identical with the foregoing except for the absence of test compound.

The anti-fungal utility of the instant compounds is evident from the results of standardized tests whereby sterile Mycophil agar plates are inoculated with *Trichophyton mentagrophytes* or *Candida albicans*; approximately 5 mg. of compound is placed on the surface of each plate so as to cover a circle approximately 4 mm. in diameter; and the plates are incubated for 96 hr. at 25° without artificial light. Undecylenic acid and nystatin serve as reference standards. Clear zones of inhibition signify the utility in question.

The anti-germinant activity of the instant compounds is evidenced from the results of a standardized test whereby three 42.5-mm. (diameter) filter paper discs are stacked in each of two 60-mm. Petri dishes, each stack is moistened with 2 ml. of distilled water, 10 white clover (*Trifolium repens*—a representative dicotyledon) seeds are arranged atop each stack at approximately equal intervals around the periphery, approximately 5 mg. of compound is placed in the center of one seed circle (the other serves as control), the dishes are covered with glass lids and then incubated at room temperatures for 10 days, and germination in the control dish is thereupon compared with that in the dish containing seeds exposed to test compound.

Those skilled in the art will recognize that observations of activity in standardized tests for particular biological effects are fundamental to the development of valuable new drugs, both veterinary and human. Distinct from such applications, anti-algal compounds are adapted to the conditioning of boiler feedwater and the like, whereas anti-germinant compounds serve as herbicides.

Preparation of the compounds of this invention proceeds by contacting a 3-[17β-hydroxy-3-(lower alkoxy) estra-1,3,5(10)-trien-17α-yl]propionic acid γ-lactone with a dialkyl carbonate in the presence of sodium hydride to give the corresponding 2-alkoxycarbonyl-3-[17β-hydroxy - 3 - (lower alkyl)estra - 1,3,5(10) - trien - 17α-yl]propionic acid γ-lactone. The ester linkage in the latter compound is saponified with boiling aqueous ethanolic potassium hydroxide, and the resultant acid is contacted with a dialkylamine and aqueous formaldehyde in methanol to give the corresponding 2-dialkylaminomethyl-3-[17β - hydroxy - 3 - (lower alkoxy)estra - 1,3,5(10)-trien-17α-yl]propionic acid γ-lactone. Upon contacting this amine with an organic ester of the formula QT in benzene or comparably inert medium (employing a closed system if the volatility of the organic ester dictates such a modification), the corresponding quaternary ammonium compound is obtained, from which 3-(17β-hydroxy-3-methoxyestra - 1,3,5(10) - trien - 17α - yl) - 2 - methylene propionic acid γ-lactone eventuates by heating the salt with 5% aqueous sodium bicarbonate in methanol.

Conversion of the amine bases of this invention to corresponding acid addition salts is effected by simple admixture of the bases with any of various inorganic and strong organic acids, the anionic portion of which conforms to T as hereinabove defined.

The following examples describe in detail compounds illustrative of the present invention and methods which have been devised for the preparation thereof. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

3-(17β-hydroxy-3-methoxyestra-1,3,5(10)-trien-17α-yl)-2-methoxycarbonylpropionic acid γ-lactone To a suspension of 100 parts of a 56% dispersion of sodium hydride in 400 parts of dimethyl carbonate is added, with stirring, a solution of 183 parts of 3-(17β-hydroxy - 3 - methoxyestra-1,3,5(10)-trien-17α-yl)propionic acid γ-lactone in 1600 parts of dimethyl carbonate. The resultant mixture is stirred intermittently at room temperatures for 4 days, whereupon insoluble solids are filtered out, washed with 660 parts of hexane, dried in air, and extracted with 4900 parts of boiling ethanol. From the ethanol extract, on chilling, 3-(17β-hydroxy-3-methoxyestra-1,3,5(10)-trien - 17α - yl) - 2 - methoxycarbonylpropionic acid γ-lactone precipitates which, filtered off and recrystallized from ethanol melts at 162–167°. The product has the formula

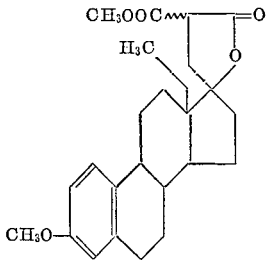

EXAMPLE 2

2-ethoxycarbonyl-3-(17β-hydroxy-3-methoxyestra-1,3,5(10)-trien-17α-yl)propionic acid γ-lactone To 44 parts of a 56% dispersion of sodium hydride suspended in 250 parts of diethyl carbonate is added, with stirring, a solution of 88 parts of 3-(17β-hydroxy-3 - methoxyestra - 1,3,5(10)-trien-17α-yl)propionic acid γ-lactone in 2000 parts of diethyl carbonate. The resultant mixture is held at room temperatures for about 5 days with intermittent stirring, whereupon insoluble solids are filtered out, successively washed with 660 parts of hexane and 350 parts of diethyl ether, and finally extracted with approximately 8000 parts of boiling ethanol. The extract, upon being concentrated to approximately ⅓₁₃ its original volume by vacuum distillation and then cooling to 5°, affords 2 - ethoxycarbonyl - 3 - (17β-hydroxy-3-methoxyestra - 1,3,5(10)-trien-17α-yl)propionic acid γ-lactone as a precipitate which, filtered off and recrystallized from ethanol, melts at 130–135°. The product has the formula

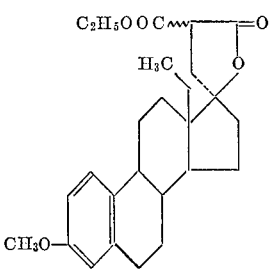

EXAMPLE 3

17β-hydroxy-3-methoxyestra-1,3,5(10)-trien-17α-ylmethylmalonic acid γ-lactone

To a solution of 10 parts of 3-(17β-hydroxy-3-methoxyestra - 1,3,5(10) - trien-17α-yl)-2-methoxycarbonylpropionic acid γ-lactone in 720 parts of ethanol is added a solution of 4 parts of 85% potassium hydroxide in 10 parts of water. The resultant mixture is heated at the boiling point under reflux for 15 minutes, during which a precipitate forms which is redissolved by introducing an additional 150 parts of water. Following the heating period, the reaction mixture is acidified with 5% hydrochloric acid and then diluted with approximately 1½ volumes of water. The mixture thus obtained is cooled to 5° for 2 hours, whereupon insoluble solids are filtered out, washed with water, dried in air, and recrystallized from ethyl acetate to give 17β - hydroxy - 3 - methoxy-estra-1,3,5(10)-trien-17α-ylmethyl-malonic acid γ-lactone melting at 151–160° with gas evolution. The product has the formula

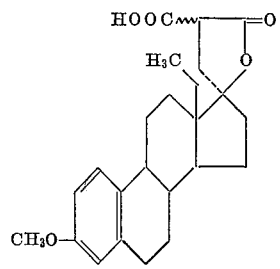

EXAMPLE 4

2-diethylaminomethyl-3-(17β-hydroxy-3-methoxyestra-1,3,5(10)-trien-17α-yl)propionic acid γ-lactone To a stirred suspension of 40 parts of 17β-hydroxy-3-methoxyestra - 1,3,5(10)-trien-17α-ylmethylmalonic acid γ-lactone and 10 parts of aqueous 37% formaldehyde in 80 parts of methanol is added 36 parts of diethylamine. Solution occurs. The solution is allowed to stand at room temperatures for about 72 hours, whereupon 420 parts of diethyl ether is introduced. The resultant mixture is filtered. The filtrate is diluted with a further 280 parts of diethyl ether; and the solution thus obtained is washed with water, dried over anhydrous sodium sulfate, and stripped of solvent by evaporation under nitrogen. The oily residue is crystallized from methanol to give 2-diethylaminomethyl - 3 - (17β-hydroxy-3-methoxyestra-1,3, 5(10) - trien-17α-yl)propionic acid γ-lactone melting at 48–52°. The product has the formula

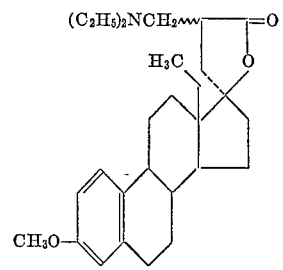

EXAMPLE 5

2 - diethylaminomethyl - 3-(17β-hydroxy-3-methoxyestra-1,3,5(10) - trien-17α-yl)propionic acid γ-lactonemethiodide To a solution of 15 parts of 2-diethylaminomethyl-3-(17β - hydroxy - 3 - methoxyestra-1,3,5(10-trien-17α-yl) propionic acid γ-lactone in 180 parts of dry benzene is added 460 parts of methyl idodide. The resultant mixture is allowed to stand for 3 hours at room temperatures, whereupon it is cooled to 5° and maintained thereat for 18 hours. The gummy precipitate which separates is filtered off, successively washed with benzene and 80 parts of acetone, and recrystallized from acetone to give 2-diethylaminomethyl - 3 - (17β-hydroxy-3-methoxyestra-1,3,5(10) - trien - 17α-yl)propionic acid γ-lactone methiodide melting at approximately 227° The product has the formula

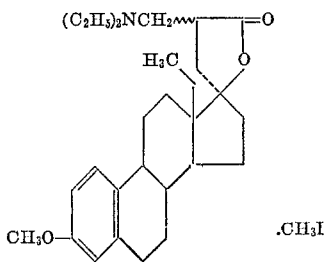

EXAMPLE 6

3-(17β-hydroxy-3-methoxyestra-1,3,5(10)-trien-17α-yl)-2-methylenepropionic acid γ-lactone To a solution of 31 parts of 2-diethylaminmethyl-3-(17β - hydroxy - 3 - methoxyestra-1,3,5(10)-trien-17α-yl) propionic acid γ-lactone methiodide in 640 parts of methanol at approximately 35° is added 880 parts of aqueous 5% sodium bicarbonate. The resultant mixture is stirred for 2 hours and then refrigerated at 5° for 70 hours. The precipitate which forms is isolated by filtration, washed with water, dried in air, and recrystallized from methanol to give 3 - (17β-hydroxy-3-methoxyestra-1,3,5(10)-trien-17α-yl)-2-methylenepropionic acid γ-lactone melting at 98–101°. The product has the formula

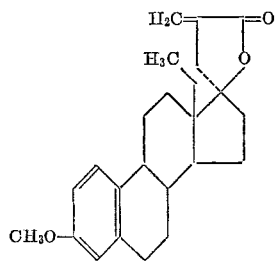

What is claimed is:

1. A compound selected from the group consisting of 3-(17β-hydroxy - 3 - methoxyestra - 1,3,5(10) - trien-17α-yl) - 2 - methylenepropionic acid γ-lactone and compounds of the formula

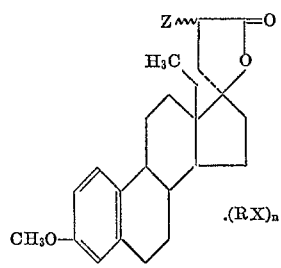

wherein Z represents (lower alkoxy)carbonyl, carboxyl, or di(lower alkyl)aminomethyl and n represents 0 except when Z represents di(lower alkyl)aminomethyl, in which circumstance n represents 0 or 1, R represents lower alkyl, and X represents halogen of atomic number >9.

2. A compound according to claim 1 which is 3-(17β-hydroxy - 3 - methoxyestra - 1,3,5(10)-trien-17α-yl)-2-methylenepropionic acid γ-lactone.

3. A compound according to claim 1 having the formula

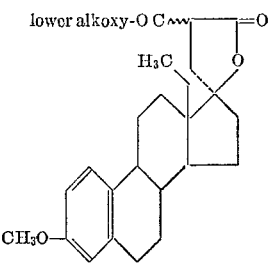

4. A compound according to claim 1 which is 3-(17β-hydroxy - 3 - methoxyestra - 1,3,5(10 - trien - 17α - yl) - 2 - methoxycarbonylpropionic acid γ-lactone.

5. A compound according to claim 1 which is 17β-hydroxy - 3 - methoxyestra - 1,3,5(10)-trien-17α-ylmethylmalonic acid γ-lactone.

6. A compound according to claim 1 having the formula

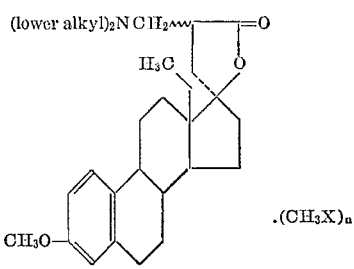

wherein n represents 0 or 1 and X represents halogen of atomic number >9.

7. A compound according to claim 1 which is 2-diethylaminomethyl - 3 - (17β - hydroxy - 3 - methoxyestra - 1,3,5(10)-trien-17α-yl)propionic acid γ-lactone.

8. A compound according to claim 1 which is 2-diethylaminomethyl - 3 - 17β - hydroxy - 3 - methoxyestra - 1,3,5(10 - trien - 17α - yl(propionic acid γ - lactone methiodide.

References Cited

UNITED STATES PATENTS 2,875,199   2/1959   Cella _____ 260—239.57
3,300,489   1/1967   Holden _____ 260—239.57

LEWIS GOTTS, Primary Examiner

ETHEL G. LOVE, Assistant Examiner

U.S. Cl. X.R.

71—67; 424—241

PO-1050
(5/69)

UNITED STATES PATENT OFFICE
CERTIFICATE OF CORRECTION

Patent No. 3,483,192         Dated   December 9, 1969

Inventor(s)            Edward A. Brown

It is certified that error appears in the above-identified patent and that said Letters Patent are hereby corrected as shown below:

Column 2, line 25, "200-500" should be -- 200-250 --

Column 2, lines 56 & 57, "their their" should be -- their --.

Column 3, line 7, "etrone" should be -- estrone --.

Column 3, line 38 "petone" should be -- peptone --.

Column 3, line 51, "12000" should be -- 1200 -- and "Balimore" should be -- Baltimore --.

Column 6, line 19, "ylmethyl-malonic" should be -- ylmethylmalonic --.

Column 6, lines 65-66, "$\gamma$-lactonemethiodide" should be -- $\gamma$-lactone methiodide --.

SIGNED AND
SEALED
JUN 16 1970

(SEAL)
Attest:

Edward M. Fletcher, Jr.
Attesting Officer

WILLIAM E. SCHUYLER, JR
Commissioner of Patents